United States Patent [19]
Ogihara

[11] Patent Number: 5,902,612
[45] Date of Patent: May 11, 1999

[54] INJECTION STRETCH BLOW MOLDING APPARATUS

[75] Inventor: Shuichi Ogihara, Komoro, Japan

[73] Assignee: Nissei Asb Machine Co., Ltd., Komoro, Japan

[21] Appl. No.: 08/946,603

[22] Filed: Oct. 7, 1997

[30] Foreign Application Priority Data

Oct. 9, 1996 [JP] Japan ..................................... 8-287404

[51] Int. Cl.⁶ ............................. B29C 31/08; B29C 49/06
[52] U.S. Cl. ......................... 425/526; 425/529; 425/533; 425/534
[58] Field of Search ..................... 425/526, 534, 425/529, 533

[56] References Cited

U.S. PATENT DOCUMENTS

| | | | |
|---|---|---|---|
| 4,140,464 | 2/1979 | Spurr et al. | 425/533 |
| 4,140,468 | 2/1979 | Duga | 425/534 |
| 4,310,282 | 1/1982 | Spurr et al. | 414/753 |
| 4,391,578 | 7/1983 | Schaar | 425/525 |
| 4,470,797 | 9/1984 | Harry et al. | 425/534 |
| 4,592,719 | 6/1986 | Bellehache et al. | 425/534 |
| 4,693,375 | 9/1987 | Schweers | 425/534 |
| 4,709,803 | 12/1987 | Swiderski | 425/534 |
| 4,767,311 | 8/1988 | Gibbemeyer | 425/526 |

FOREIGN PATENT DOCUMENTS

| | | |
|---|---|---|
| 2389580 | 12/1978 | France . |
| 2394381 | 1/1979 | France . |
| 2394383 | 1/1979 | France . |
| 8-132517 | 5/1996 | Japan . |
| WO96/08356 | 3/1996 | WIPO . |

*Primary Examiner*—Robert Davis
*Attorney, Agent, or Firm*—Cislo & Thomas LLP; David L. Hoffman

[57] ABSTRACT

An injection stretch blow molding apparatus has an injection molding station and a blow molding station, with a transfer station positioned therebetween. The injection molding station has an injection molding section which molds preforms and a removal section which removes the preforms from an injection core mold. The blow molding station carries out circulating transfer of carrying members which support the preforms, and in the blow molding section the preforms are blow molded into containers. The transfer station has a receiving mechanism which receives preforms removed from the injection core mold in the injection molding station in the upright state, an inverting receiving mechanism which inverts the preforms and passes them in the inverted state to carrying members, and between the receiving mechanism and the inverting receiving mechanism, a movement mechanism transferring the preforms from the receiving mechanism to the inverting receiving mechanism.

11 Claims, 10 Drawing Sheets

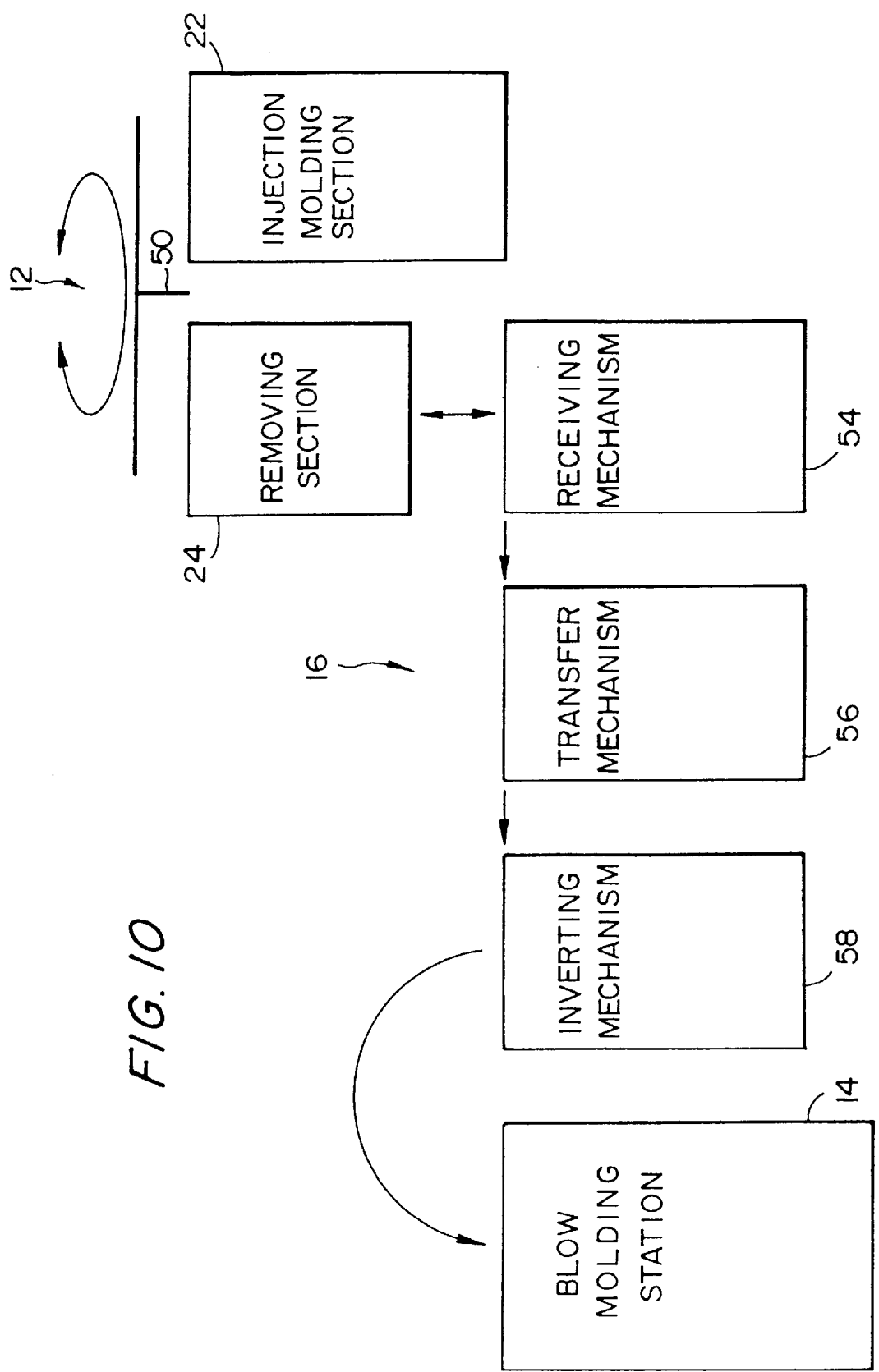

INJECTION STRETCH BLOW MOLDING APPARATUS

BACKGROUND OF THE INVENTION

1. Field of the Invention

The present invention relates to an injection stretch blow molding apparatus and method, and particularly to an injection stretch blow molding apparatus and method provided with a transfer station which transfers preforms from an injection molding station to a blow molding station.

2. Description of the Prior Art

An injection stretch blow molding apparatus and method has previously been disclosed in Japanese Patent Application Laid-Open No. 8-132517 by the applicant of the present invention.

The above invention has an injection molding station in which a preform is injection-molded, a blow molding station in which the preform is stretch blow molded, and a transfer station which transfers preforms from an injection molding station to the blow molding station.

In the injection molding station, a plurality of preforms are injection-molded simultaneously, each preform is cooled by an injection molding core mold, and after the preform has cooled to a temperature at which removal is possible, the preform is removed from the injection core mold by a removal section.

In the transfer station, the plurality of simultaneously injection-molded preforms are, either in a single operation or divided into a plurality of operations, delivered to a blow molding station. In detail, there is provided a receiving mechanism which receives a plurality of simultaneously molded preforms, and an inverting and delivering mechanism which, either in a single operation or divided into a plurality of operations, inverts the preforms received by the receiving mechanism from the upright state and delivers them to the blow molding station.

In the blow molding station, preforms received from the transfer station are carried by a carrying member which is circulatingly carried. The preforms are carried into a blow molding section in batches numbering fewer than the number of preforms molded simultaneously through a heating section and a standby section, then are blow-molded.

With this system, preforms are molded with a reduced injection molding cycle time while maintaining an adequate cooling time. Moreover, the operating efficiency of the blow cavity mold can be increased.

The present invention is a further development of this injection stretch blow molding apparatus and method.

SUMMARY OF THE INVENTION

The object of the present invention is to provide an injection stretch blow molding apparatus and method which allows more time between the removal of a preform from the injection molding station and the transfer of the preform to the blow molding station. Moreover, the influence during the blow molding due to the thermal distribution applied to the preform during injection molding is further reduced.

Another object of the present invention is to provide an injection stretch blow molding apparatus and method in which the operating time of the receiving mechanism which receives the preforms from the injection molding station can be reduced. Furthermore, the receiving mechanism can rapidly be ready to stand by in the receiving position, in accordance with the operating cycle time of the injection molding station.

A further object of the present invention is the efficient cooling particularly of a thick preform.

An injection stretch blow molding apparatus of the present invention comprising:
- an injection molding station in which preforms are injection molded in an upright state with neck portions thereof facing upward;
- a blow molding station in which carrying members supporting the preforms are circularly carried and the preforms are stretch blow molded into containers in an inverted state;
- a transfer station for inverting the preforms removed from the injection molding station and for transferring the preforms to the carrying members of the blow molding station; and wherein the transfer station includes:
- a receiving mechanism for receiving the preforms from the injection molding station in the upright state;
- an inverting and delivering mechanism for inverting the preforms at least one at a time and for delivering the preforms in the inverted state to the carrying members; and
- a movement mechanism disposed between the receiving mechanism and the inverting and delivering mechanism, and for moving the preforms from the receiving mechanism to the inverting and delivering mechanism in the upright state.

According to one aspect of the present invention, in the transfer station, a movement mechanism is provided between the receiving mechanism and the inverting and delivering mechanism. In this way, the movement mechanism functions as a buffer, and more time can be taken between removing the preforms from the injection molding station and delivering them to the blow molding station. Particularly for preforms of thick construction, this allows the temperature difference between the inner and outer walls to be minimized, and provides time for gentle cooling, thus reducing the unfavorable influence at the time of blow molding caused by the temperature distribution applied to the preform during the injection molding process. Moreover, immediately after delivering the preforms to the movement mechanism, the receiving mechanism can be returned to the receiving position for the next preforms. As a result, the flexibility of timing for removing preforms from the injection molding station is increased. It should be noted that the delivery of preforms from the transfer station to the blow molding station is achieved by the movement mechanism, the inverting and delivering mechanism, and the carrying members, without involving the receiving mechanism.

The receiving mechanism preferably has N numbers of first supporting members for receiving and supporting N ($N \geq 2$) numbers of preforms simultaneously injection molded in the injection molding station. Furthermore, the movement mechanism preferably has at least N second supporting members.

By the N number of first supporting members and N number of second supporting members, the N number of preforms simultaneously injection molded can be transferred from the receiving mechanism to the movement mechanism in a single operation.

The blow molding station has a blow molding section for blow molding n ($1 \leq n < N$) number of the preforms into n number of containers at a time; and wherein the inverting and delivering mechanism preferably has n number of third supporting member inverting and delivering the same n number of the preforms as are to be simultaneously blow molded by the blow molding station. If N number of preforms are delivered simultaneously, the number of the third supporting members is increased. Therefore, by delivering a number n appropriate to the blow molding cycle, the number of the third supporting members can be reduced. It should be noted that the time required for delivery in this way is increased. Nevertheless, since the receiving mechanism is not involved in the delivery operation, and the receiving mechanism can be immediately returned to the receiving position.

The movement mechanism preferably has a circulatory movement means circulating and moving at least N numbers of second supporting members. This makes easy the movement of the second supporting members from the receiving position from the receiving mechanism to the delivery position leading to the inverting and delivering mechanism.

The circulatory movement means preferably have a first endless moving member circulating in a vertical plane, and at least N numbers of second supporting members fixed thereto. In this way, the space required for the circulatory movement means can be kept to a minimum. It should be noted that if the first endless moving member has an upper movement region provided with the receiving position and the delivering position, the preform can be transferred in the upright state.

The circulatory movement means may also have a second endless moving member circulating in the horizontal plane, and at least N numbers of second supporting members fixed thereto. In this way, the second endless moving member may have first and second movement regions mutually parallel in the horizontal plane, and a large number of preforms can be transferred in the upright state. As a result, the ability of the circulatory movement means to function as a buffer is increased, and a longer cooling time is available.

Each of the N numbers of second supporting members preferably has a depression receiving and supporting the bottom of the preforms in the upright state.

By this means, without being affected by the shape of the preform, it can be securely supported. In particular, secure support is possible in the case that the body portion is fatter than the flange portion of the neck portion of the preform.

Each of at least the N numbers of second supporting members may have a pair of opening and closing members biased toward the closed position by a resilient member. This pair of opening and closing members supports a portion under the neck portion of the preform. In this way, the support and removal operations on the preform may be simplified.

The injection molding station may have:
two injection core molds;
a rotary member which rotates around a rotating shaft and supports the two injection core molds at positions opposite to each other with the rotating shaft in the center;
an injection molding section including one injection cavity mold which is clamped alternately with one of the two injection core molds for injection molding the N numbers of preforms; and
an ejecting section for ejecting the N numbers of injection molded preforms from the other of the two injection core molds which is carried out of the injection molding section by rotation of the rotary member. In this case, the ejecting section may comprise N numbers of cooling pots into which are inserted the N numbers of preforms supported by the other of injection core molds; and
elevator means for raising the N numbers of cooling pots to a position at which the N numbers of preforms are inserted and for lowering the N numbers of cooling pots before the N numbers of preforms are ejected.

With this construction, the preforms can be cooled from the outside by the cooling pots in the removal section, and in particular the cooling efficiency for thick preforms can be further increased.

BRIEF DESCRIPTION OF THE DRAWINGS

FIG. 10 is a schematic diagram showing the process of the present invention.

PREFERRED EMBODIMENTS OF THE INVENTION

The present invention is now described in terms of a number of preferred embodiments, with reference to the drawings.

Figure 1:
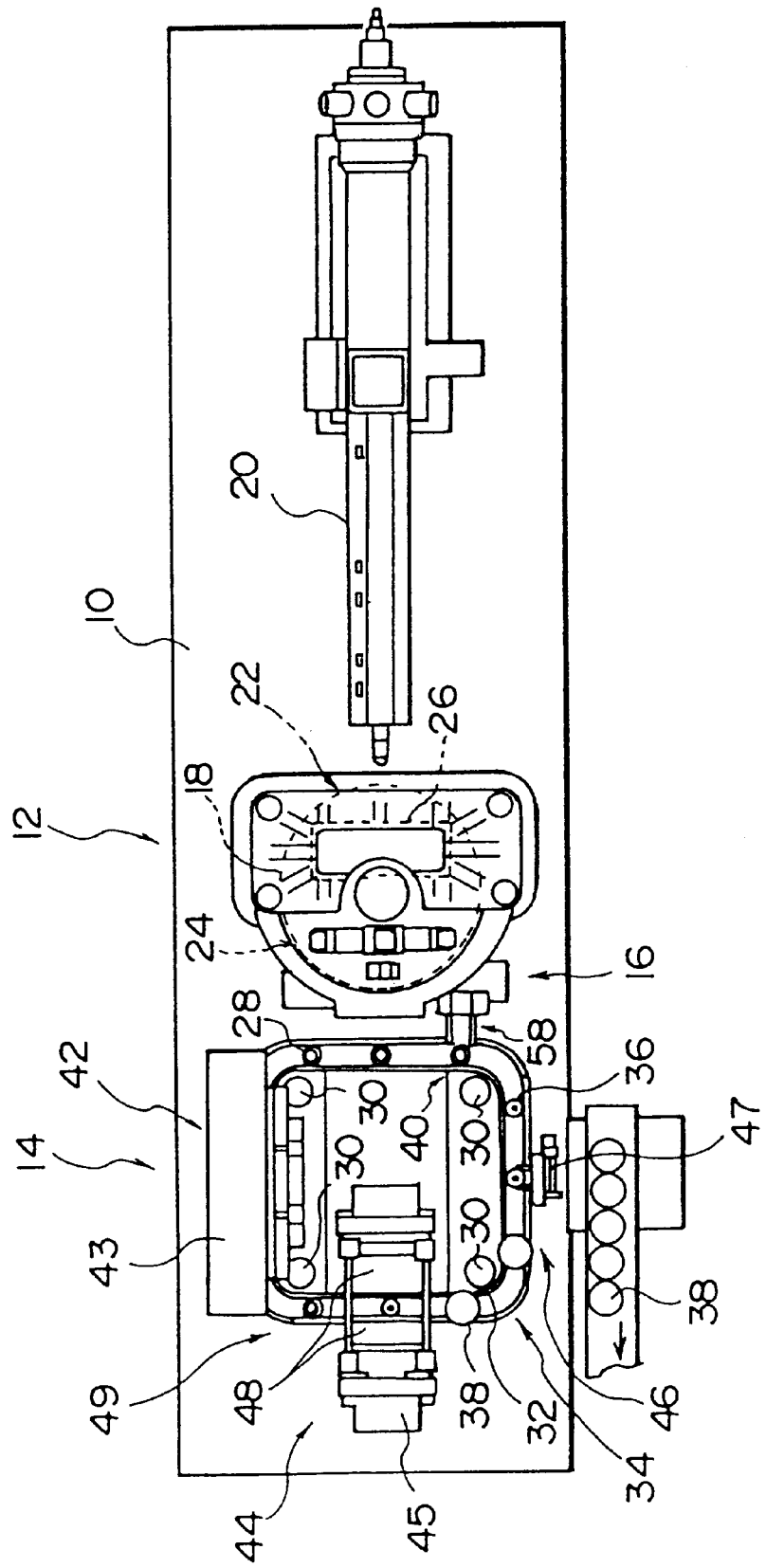
FIG. 1 is a plan view of an injection stretch blow molding apparatus being an embodiment of the present invention.

FIGS. 1 to 7 show an injection stretch blow molding apparatus being an embodiment of the present invention. FIG. 1 is a plan view of the injection stretch blow molding apparatus.

This injection stretch blow molding apparatus has provided on a machine base 10 in broad outline an injection molding station 12, a blow molding station 14, and a transfer station 16 positioned between the injection molding station 12 and blow molding station 14.

The injection molding station 12 has two injection core molds (not shown in the drawings) which are disposed by 180 degrees apart, and a turntable 18 which intermittently circulates the injection core molds along a rotary carrying path. The injection molding station 12 also comprises an injection molding section 22 which is provided opposite to an injection molding apparatus 20, and a removal section 24 is provided opposite to the injection molding section 22. Each of the injection core molds is stopped at the injection molding section 22 or the removal section 24.

The injection molding section 22 has an injection cavity mold 26 which can be clamped with respect to each of the injection core molds, and simultaneously injection-molds for example four preforms 28 (see FIGS. 2 to 7).

Figure 2:
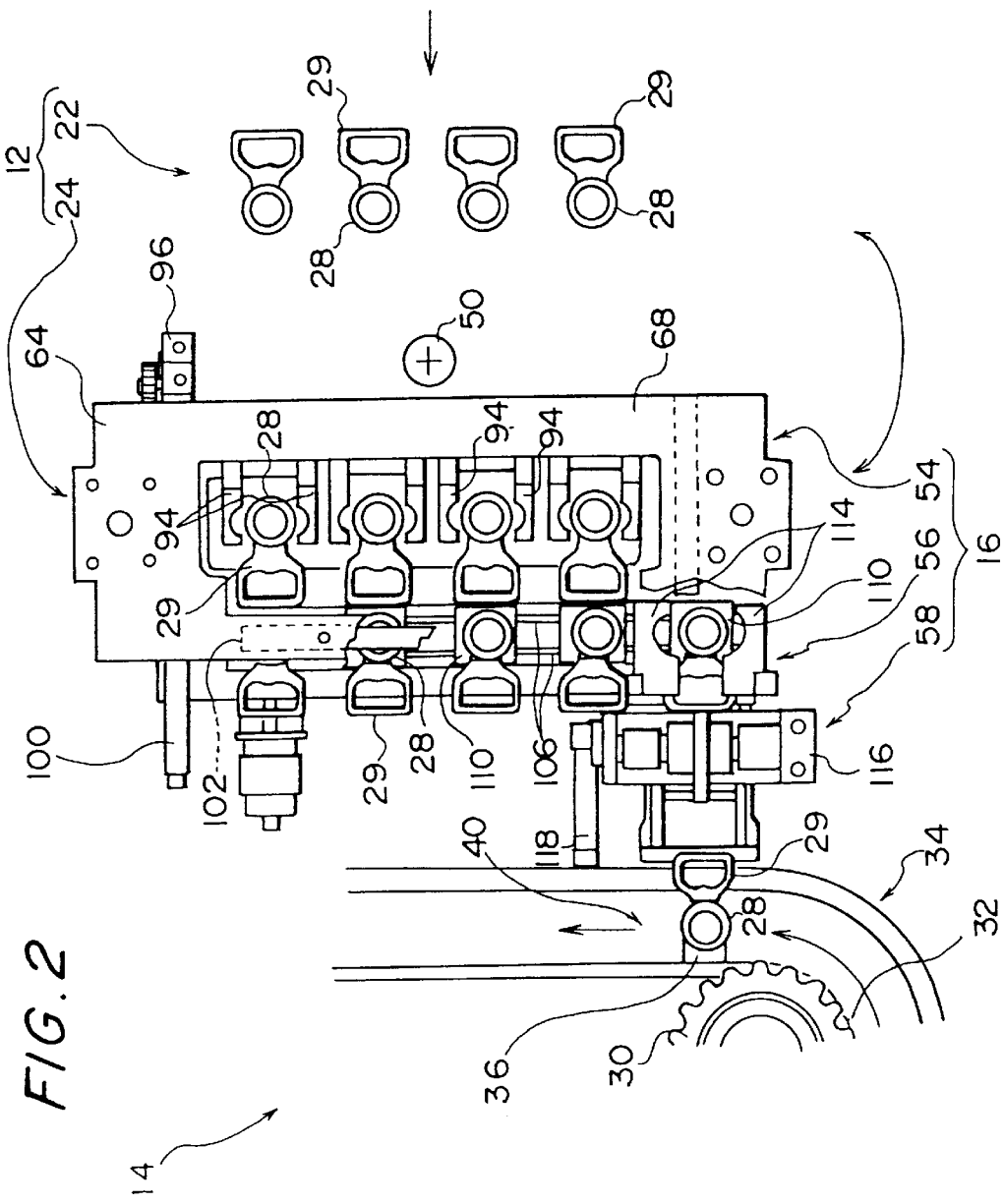
FIG. 2 is an enlarged plan view of the transfer station of FIG. 1.

The injection molding section 22 is such that, as shown for example in FIG. 2, preforms 28 are injection-molded with integral handles 29.

In the removal section 24, the injection core molds are released relative to the preforms 28, so that the preforms 28 can be removed from the injection core molds.

In this embodiment, the neck portion of the preforms 28 is molded by a neck cavity mold (not shown in the drawings), and the preforms 28 are supported by the neck cavity molds and injection core molds and carried by the turntable 18 to the removal section 24.

In the removal section 24, the preform 28 can be removed by releasing the preforms 28 from the neck cavity molds after partial releasing from the injection core molds.

The blow molding station 14 has a carrying means 34 comprising four sprockets 30, a carrying chain 32 passed around four sprockets, and a device for driving the sprockets (not shown) such as an electric motor driving one of the sprockets or a pinion attached to a sprocket and to a rack attached to a hydraulic cylinder.

The carrying chain has a plurality of for example twelve carrying members 36 fixedly connected thereto and spaced at equal intervals. The preforms 28 or containers 38 are supported by each of the carrying members 36. Along a circulatory carrying path of these carrying members 36 are provided an receiving section 40 which receives preforms 28 from the transfer station 16, a heating section 42 which heats preforms 28 received by the receiving section 40 to at least a temperature appropriate to blow molding, a blow molding section 44 which stretch blow molds preforms 28 heated at the heating section 42 into containers 38, and a container removal section 46 for removing the containers 38 blow-molded at the blow molding section 44 from the apparatus.

In the heating section 42, a heating device 43 is disposed. The heating device 43 may include a plurality of infrared heaters extending along the carrying path and disposed one above another. As the preforms are moved through the heating device 43, the sprockets provided on the carrying members 36 engage with the preform rotation chain, and rotate the preforms to be heated uniformly around the circumferential direction.

The blow molding section 44 has a blow cavity mold 48 clamped against the preform 28 by a blow mold clamping mechanism 45, and may blow mold a single preform 28.

The container removal section 46 includes a removal device 47 for inverting a container 38 into an upright state in which the container 38 is removed from the system.

Between the heating section 42 and the blow molding section 44 is provided a standby section 49 in which the preform 28 which is heated by the heating section 42 is temporarily put on standby.

The transfer station 16 delivers preforms 28 from the removal section 24 of the injection molding station 12 to the receiving section 40 of the blow molding station 14.

In the removal section 24 of the injection molding station 12, the number of preforms 28 simultaneously injection molded at the injection molding section 22 are removed. Nevertheless, the transfer station 16 may deliver for example four preforms 28 simultaneously removed at the removal section 24 to the receiving section 40 one at a time.

While at the injection molding station 12, the preforms 28 are injection-molded in the upright state, in the transfer station 16 the preforms 28 are inverted and delivered to the blow molding station 14 in the inverted state.

Next, the removal section 24 of the injection molding station 12 and the transfer station 16 are described in detail with reference to FIGS. 2 to 7.

In FIG. 2, the preforms 28 with handle 29 which are injection-molded in the injection molding section 22 of the injection molding station 12 are rotatably carried around the rotating shaft 50 of a turntable (not shown in the drawings) to the removal section 24.

In the removal section 24, the preforms 28 are cooled by a cooling pot 84 before the preforms 28 are removed from the injection core mold.

After cooling by the cooling pot 84, in the transfer station 16 the preforms 28 are delivered to carrying members 36 attached to the carrying chain 32 of the blow molding station 14. The transfer station 16 comprises a receiving mechanism 54, a movement mechanism 56, and an inverting and delivering mechanism 58, and the cooling pot 84 is incorporated within the receiving mechanism 54.

Figure 3:
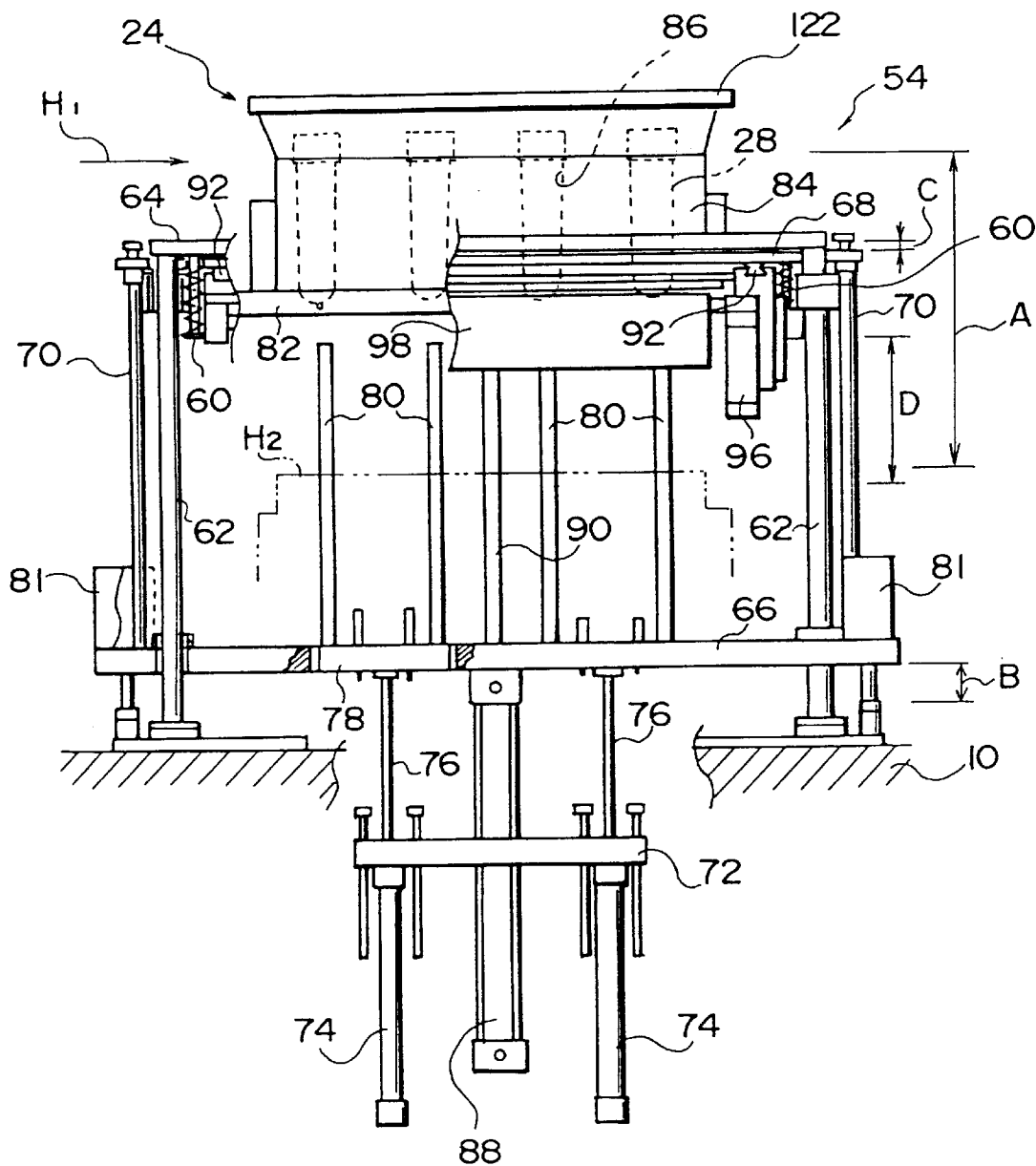
FIG. 3 is a front elevation of the receiving mechanism of FIG. 2.
Figure 4:
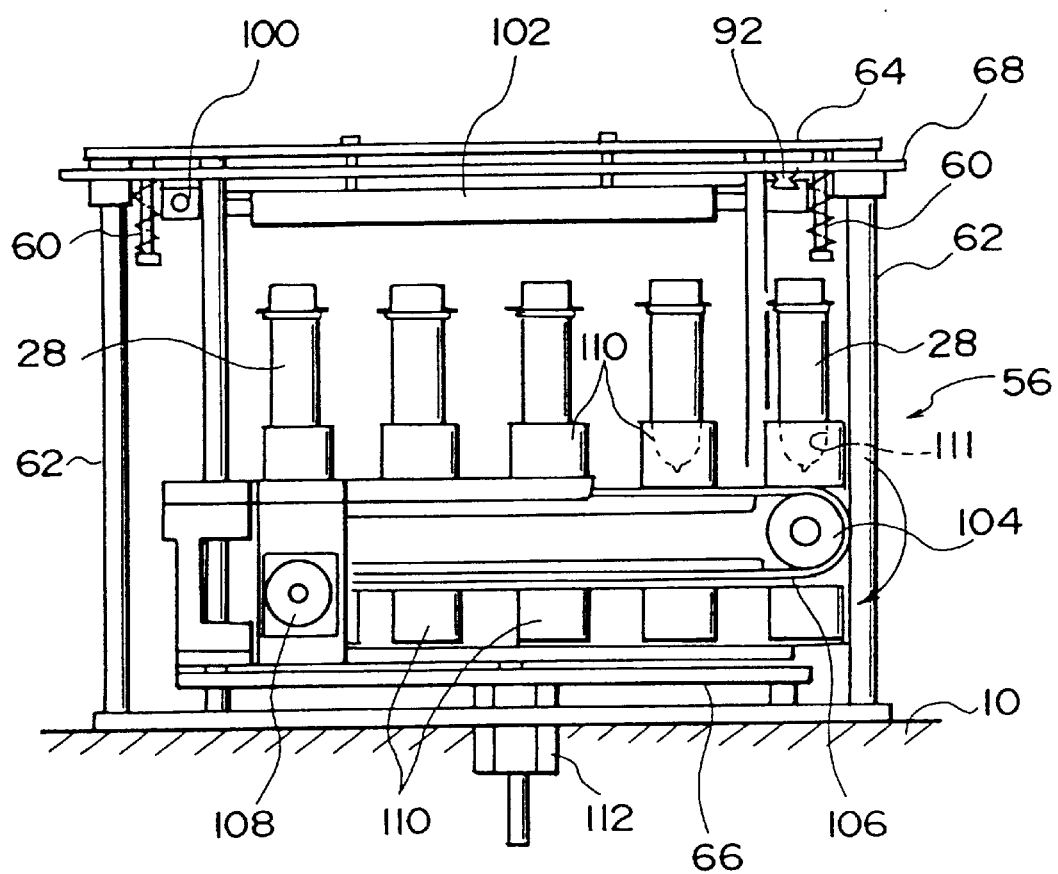
FIG. 4 is a rear elevation of the movement mechanism of FIG. 2.

The receiving mechanism 54, as shown in FIG. 3, has a fixing frame 64 supported by support pillars 62 on the base 10, and a lower movable frame 66 and upper movable frame 68 are mounted on the support pillars 62 so as to be slidable in the vertical direction.

The upper movable frame 68 is urged upward by urging members 60 attached to the fixing frame 64, and has push-down rods 70 attached to the lower movable frame 66 passed through, and is able to be engaged with a separation of the distance C from the ends of the push-down rods 70.

Below the lower movable frame 66, a first elevating cylinder fixing plate 72 is fixed by means of a linking rod 65 (see FIG. 5), and this first elevating cylinder fixing plate 72 has attached two first elevating cylinders 74; two bottom supporting members 80 supporting the bottom of a preform 28 through support plates 78 at the ends of elevating rods 76 of these first elevating cylinders 74, pass through the lower movable frame 66 and are able to move vertically. These bottom supporting members 80 are able to be moved vertically through the distance D by the first elevating cylinders 74.

Again, the lower movable frame 66 is able to be moved through the distance B by the second elevating cylinders 81 disposed at both ends thereof.

Furthermore, a cooling pot stand 82 is supported by the support pillars 62 so as to be movable vertically, and on this cooling pot stand 82 is fixed a cooling pot 84.

The cooling pot 84 has a plurality of for example four cooling depressions 86 which have substantially the same internal shape as the external shape of the preforms 28, and around these depressions are passages (not shown in the drawings) through which is circulated cooling water at between 10 and 20 degrees C. the same as the injection mold. In the bottom of the cooling depressions 86 of the cooling pot 84 and the corresponding position of the cooling pot stand 82, are formed through holes allowing the bottom supporting members 80 to pass through.

Further, the cooling pot 84 is able to be moved vertically through the distance A by a cooling pot elevating cylinder 88 being an elevating means between the cooling position H1 of the preforms 28 in the removal section 24 at the time of clamping the injection mold and a retracted position H2 when the preforms 28 are being transferred.

The cooling pot elevating cylinder 88 is fixed to the lower movable frame 66, and an elevating rod 90 thereof is fixed to the cooling pot stand 82; in the raised position the cooling pot 84 contacts a neck cavity mold 122 which holds the necks of the preforms 28 in the removal section 24, and is arranged to cool the preforms 28 from the outside.

It should be noted that when a preform 28 is supported by the neck cavity mold 122, within the preform 28 an injection core mold not shown in the drawings is inserted.

Further, the lower surface of the upper movable frame 68 includes a plurality of first supporting members 94 corresponding to the number of preforms 28. The first supporting members 94 are movable from the removal section 24 to the movement mechanism 56 through a pair of guide rails 92.

Figure 5:
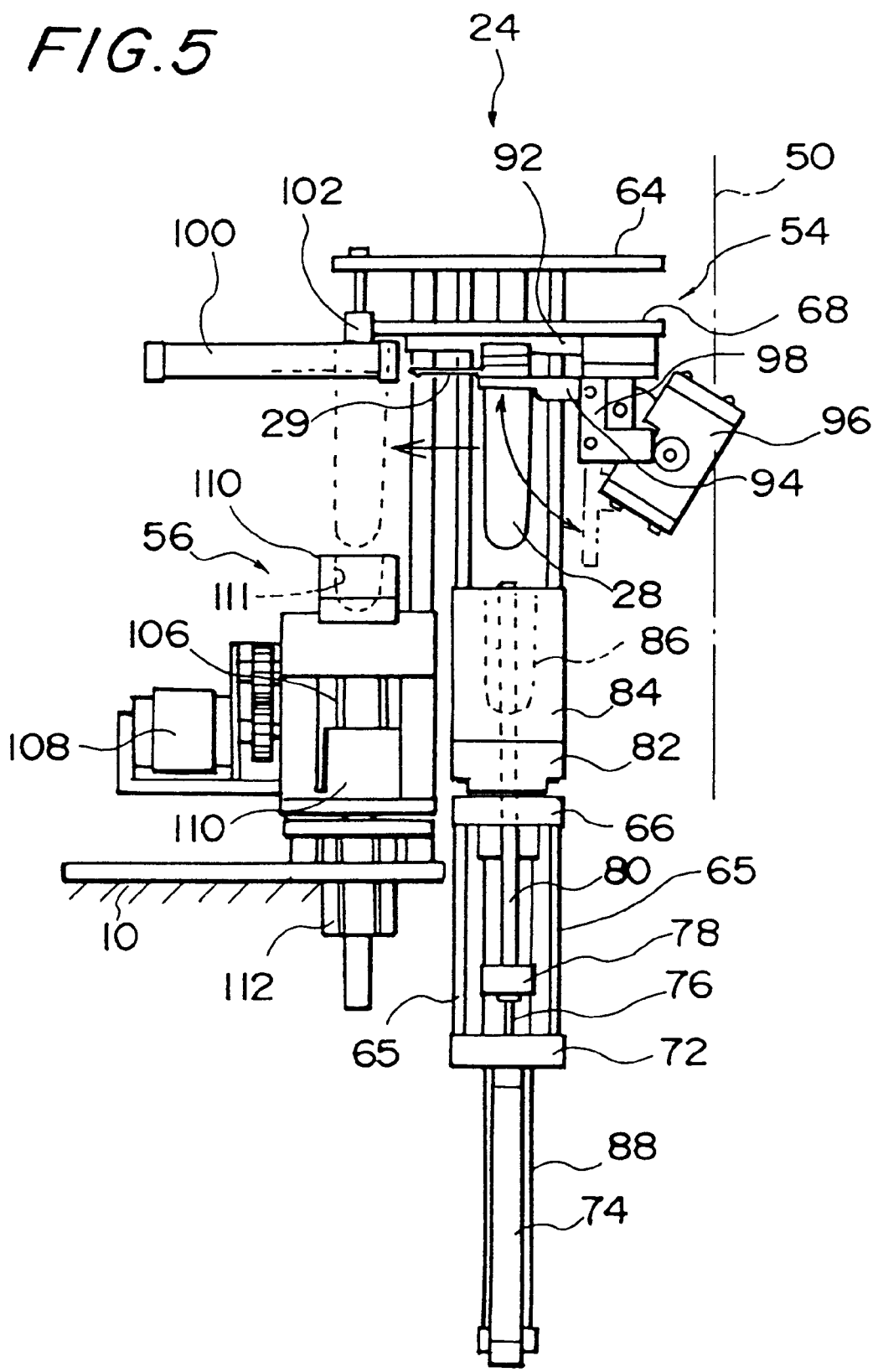
FIG. 5 is a side elevation of the receiving mechanism and movement mechanism.
Figure 6:
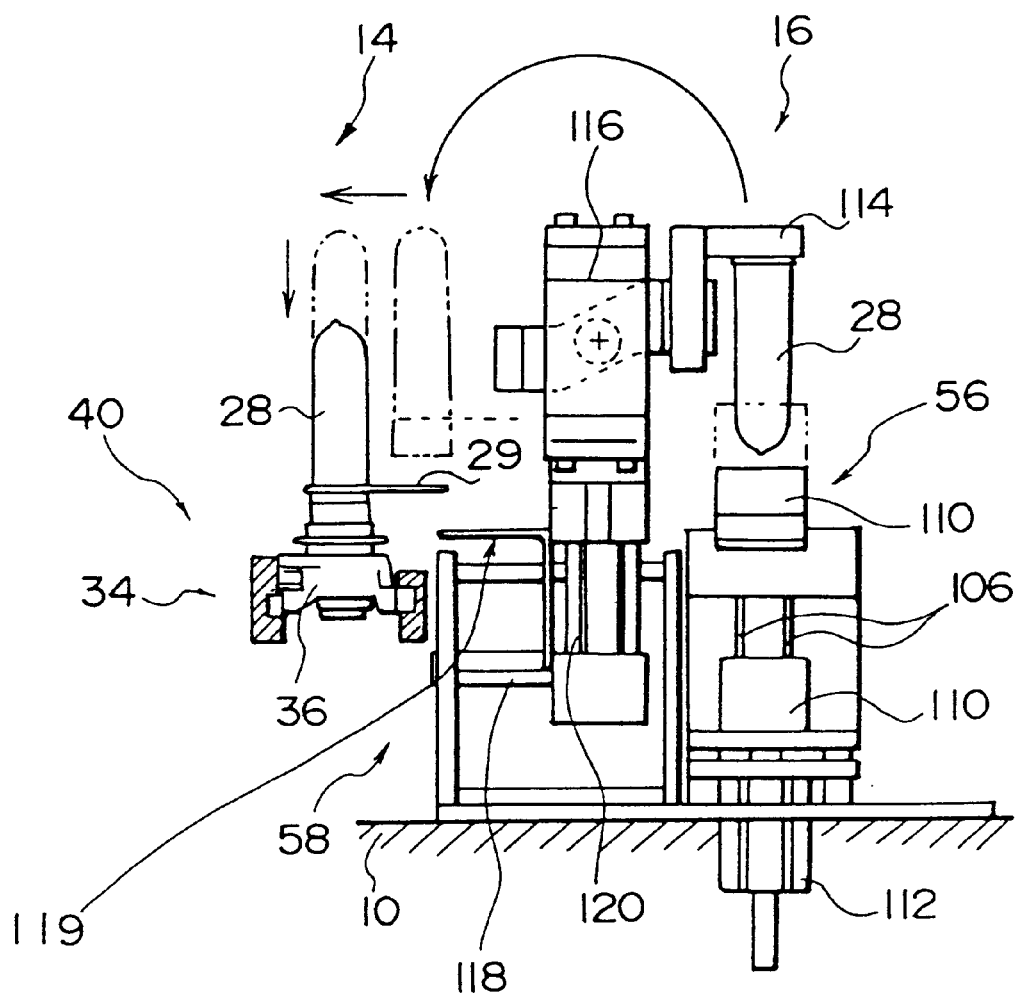
FIG. 6 is a side elevation of the movement mechanism and inverting and delivering mechanism.

Each of the first supporting members 94, as shown in FIG. 5, is rotatably movable by a supporting member retracting cylinder 96 between a supporting position in the horizontal orientation and a retracted position in the vertical orientation as shown by a broken line.

Again, the first supporting member 94 can be opened and closed by a supporting member opening and closing mechanism 98, and in the supporting position is able to support the portion under the neck portion of the preforms 28.

It should be noted that the supporting member opening and closing mechanism 98 may employ a rack and pinion opening and closing means of a well-known type.

Further, each of the first supporting members 94, as shown in FIG. 5, is capable of horizontally moving the preforms 28 from the removal section 24 to the upper position of the movement mechanism 56 by means of a horizontal drive cylinder 100.

It should be noted that above the preforms 28 moved above the movement mechanism 56 by means of the first supporting members 94 is provided a restraining plate 102 attached to the fixing frame 64.

The movement mechanism 56 allows a movement chain 106 passed around vertically disposed movement sprockets 104 to be rotated intermittently in the vertical plane by means of a rotary actuator 108; to this movement chain 106 are attached for example ten second supporting members 110, and the second supporting members 110 are arranged to be intermittently circulated one at a time so that four of the second supporting members 110 are positioned at the receiving position of preforms 28 from the receiving mechanism 54 and one of the second supporting members 110 is positioned at the receiving position of the inverting and delivering mechanism 58.

The second supporting members 110 have depressions 111 receiving the bottom and a part of the body of the preforms 28, and move the preforms 28 with the bottoms supported, one at a time to the receiving position of the inverting and delivering mechanism 58.

Again, the movement mechanism 56 can be raised and lowered by a third elevating cylinder 112, and raising with respect to preforms moved to the upper position of the second supporting members 110 by the first supporting members 94 is arranged to accept the preforms 28, and at this time the restraining plate 102 serves to position the top of the preforms 28.

The inverting and delivering mechanism 58 has for example one third supporting member 114 disposed opposing the receiving position of the movement mechanism 56.

The third supporting member 114 can be opened and closed by a supporting member opening and closing mechanism (not shown in the drawings), and, when the second supporting members 110 are in the position of being raised by the third elevating cylinder 112, is able to support the neck portion of a preform 28. This supporting member opening and closing mechanism may employ a rack and pinion opening and closing means of a well-known type.

Again, the third supporting member 114 is able by means of an inverting drive device 116 to rotate through 180 degrees from the movement mechanism 56 to the receiving section 40 of the blow molding station 14, and invert the preforms 28 from the upright state to the inverted state.

Then this inverting position is the standby position for delivering preforms 28 to the carrying members 36 in the position of the receiving section 40 of the blow molding station 14.

Again, the third supporting member 114 is able to be moved horizontally from the side of the movement mechanism 56 to the side of the receiving section 40 of the blow molding station 14 by means of an advance and retract drive device 118, and is able to move to a position above the carrying members 36.

Again, the inverting and delivering mechanism 58 is provided with a positioning means 119 for the carrying members 36, and when moved to the side of the receiving section 40 by the advance and retract drive device 118, positioning in engagement with the carrying members 36 is achieved.

Further, the third supporting member 114 is able to be moved vertically by a fourth elevating cylinder 120, and in respect of a preform 28 positioned above the carrying members 36 of the blow molding station 14, by lowering the third supporting member 114, a preform neck portion is inserted into a projecting support portion of the carrying members 36 (not shown in the drawings), and by opening the third supporting member 114, the neck portion of the preform 28 is released, and the delivery is completed.

By carrying the reverse operation to the above operations, the state for receiving the next preform 28 from the movement mechanism 56 is adopted.

Next, the method of injection blow molding using the above described injection stretch blow molding apparatus is described.

In this injection blow molding method, as shown schematically in FIG. 10, in the injection molding station 12 first in the injection molding section 22 preforms are injection-molded in the upright state, and these preforms are rotated through 180 degrees around the rotating shaft 50 and carried to the removal section 24.

Preforms removed in the removal section 24 are received by the receiving mechanism 54 of the transfer station 16, remaining in the upright state, and are then transferred by the movement mechanism 56 to the inverting and delivering mechanism 58.

In the inverting and delivering mechanism 58, preforms in the upright state are inverted by turning through 180 degrees, and are delivered to the blow molding station in the inverted state.

The preforms in the inverted state are then blow-molded in the blow molding station 14.

This is now described in detail.

First, in the injection molding station 12, in the injection molding section 22 a plurality of for example four preforms 28 with handles 29 attached are injection-molded, and these preforms 28, supported by the neck cavity mold 122 (see FIGS. 3 and 7) and injection core mold 124 (see FIG. 7), are carried by the turntable 18 to the removal section 24.

In the removal section 24, after the preforms 28 are cooled from the outside by the cooling pot 84, for example four preforms 28 taken at the transfer station 16 are delivered to the movement mechanism 56.

Figure 7:
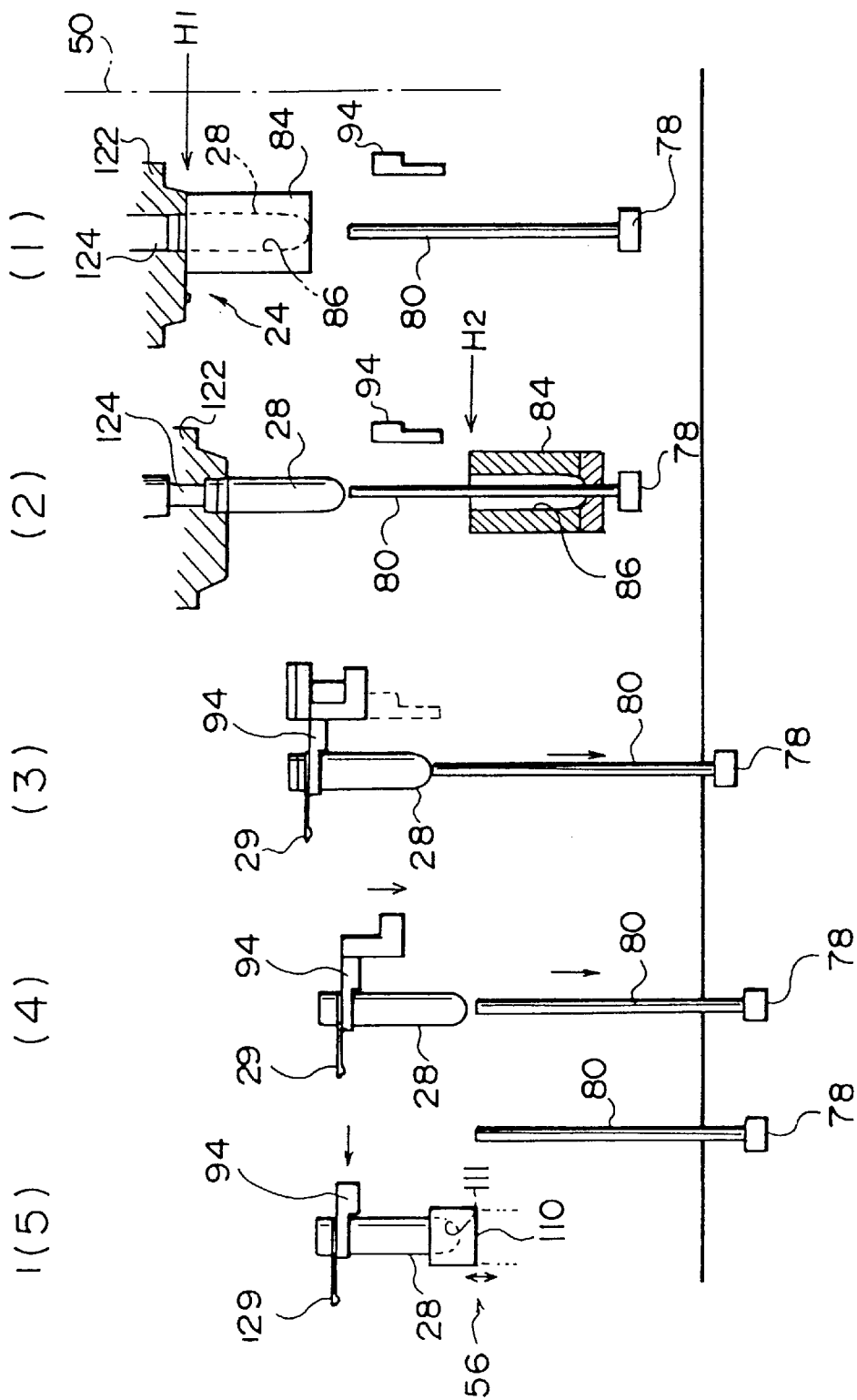
FIG. 7 is a process diagram showing the operation of the receiving mechanism from the cooling of a preform by a cooling pot, receiving the preform and delivering the same to the movement mechanism.

To describe this state with reference to FIG. 7, first the preforms 28 supported by the neck cavity mold 122 and injection core mold 124 are carried around the rotating shaft 50 of the turntable to the removal section 24, and together with the turntable 18 are lowered to the clamping position H1 for injection molding. Then the cooling pot 84 is raised by the cooling pot elevating cylinder 88, and in the clamping position H1 contact is made with the neck cavity mold 122, and the preforms 28 are cooled from the outside.

In this case, with the upper movable frame 68 raised by the distance B in FIG. 3 by the second elevating cylinders 81, the bottom supporting members 80 are raised by the distance D by the first elevating cylinders 74, and further, the first supporting members 94 are positioned in the retracted position by the supporting member retracting cylinder 96 (see FIG. 7(1)).

Next, after the preforms 28 have been cooled from the outside by the cooling pot 84 for a particular time interval, the cooling pot 84 is lowered by the distance A in FIG. 3 from the position H1 at the height of the neck cavity mold 122 clamping to the retracted position H2, thus being retracted.

The interval of cooling by the cooling pot lies within the injection molding time, that is to say, within the time during which the mold is clamped, and within the range of time such that there is no impediment to transfer of the preforms, any time interval may be used according to the molding conditions corresponding to the product.

In this state, the neck cavity mold 122 is lowered somewhat, and with a part of the injection core mold 124 remaining within the preforms 28, the preforms 28 are released from the injection core mold 124. At this time, the lower ends of the preforms 28 contact the upper ends of the bottom supporting members 80, and are then supported by the bottom supporting members 80 (see FIG. 7(2)).

Next, from the state in FIG. 7(2), the neck cavity mold 122 is opened, and the bottom supporting members 80 are lowered together with the preforms 28 by the first elevating cylinders 74 through the distance D in FIG. 3.

In this lowered state, the injection core mold remains slightly within the preforms 28, and the preforms 28 are supported at their upper ends by the injection core mold 124, and supported at their lower ends by the bottom supporting members 80, and in this state are prevented from falling over. From this state, by means of the supporting member retracting cylinder 96, the first supporting members 94 are rotated through 90 degrees from the retracted position to the supporting position, the first supporting members 94 are closed, and the neck portion of the preforms 28 and/or the bottom thereof is supported (see FIG. 7(3)).

Next, by means of the second elevating cylinders 81 the lower movable frame 66 is lowered by the distance B in FIG. 3. In this way, the bottom supporting members 80 attached to the lower movable frame 66 are lowered by the distance B in FIG. 3, and the upper movable frame 68 is lowered lagging by the distance C in FIG. 3 until engaging with the push-down rods 70, and as a result of which the first supporting members 94 attached to the upper movable frame 68 are lowered by a distance (B–C), and the bottoms of the preforms 28 and the tips of the bottom supporting members 80 are separated by the distance C in FIG. 3, so that the preforms 28 are movable horizontally (see FIG. 7(4)).

From this state, by means of the horizontal drive cylinder 100 the first supporting members 94 are moved horizontally as far as the position over the third supporting member 114 of the movement mechanism 56, the movement mechanism 56 is raised by the third elevating cylinder 112, and with the bottoms of the preforms 28 supported by the second supporting members 110, opening of the first supporting members 94 completes the passing of the preforms 28 to the movement mechanism 56 (see FIG. 7(5)).

Up to this point, the plurality of for example four simultaneously injection-molded preforms 28 are simultaneously removed in the removal section 24, are simultaneously received by the receiving mechanism 54 of the transfer station 16, and are simultaneously passed to the movement mechanism 56.

In the movement mechanism 56, the second supporting members 110 supporting the simultaneously received, for example four, preforms 28 are moved to the delivery position to the inverting and delivering mechanism 58 one at a time, by the intermittent driving of the movement chain 106 by driving the rotary actuator 108.

The inverting and delivering mechanism 58 closes the third supporting member 114 and supports the neck portion of the preforms 28 in the receiving position raised by the third elevating cylinder 112; with the second supporting members 110 lowered by means of the third elevating cylinder 112, rotates the third supporting member 114 through 180 degrees by means of the inverting drive device 116, inverting the preforms 28 from the upright state to the inverted state; and waits until the carrying members 36 of the blow molding station 14 are carried and come to a halt in the receiving section 40.

At the point when the carrying members 36 come to a halt, the third supporting member 114 is moved horizontally to the side of the carrying members 36 by the advance and retract drive device 118, and with the preforms 28 positioned above the carrying members 36, after lowering with the fourth elevating cylinder 120 and inserting in the carrying members the preforms 28, the third supporting member 114 is opened, and the preforms 28 are released, and when the third supporting member 114 has been moved to the standby position, the carrying members 36 become able to carry.

In the blow molding station 14 preforms 28 supported in the inverted state by the carrying members 36 are intermittently carried by the carrying means 34, and passing through the heating device 43 provided in the heating section 42 the preforms are heated to at least the temperature for blow molding, after which before being carried to the blow molding section 44, being put on standby in the standby section 49, evening out of the temperature of the heating by means of the heating section 42 is carried out, after which in the blow molding section 44 blow molding to container shape is carried out.

Containers 38 with attached handles 29 blow-molded in the blow molding section 44 are carried to the removal section 24, and in the container removal section 46, containers 38 are inverted from the inverted state to the upright state by the removal device 47 and removed.

Figure 8:
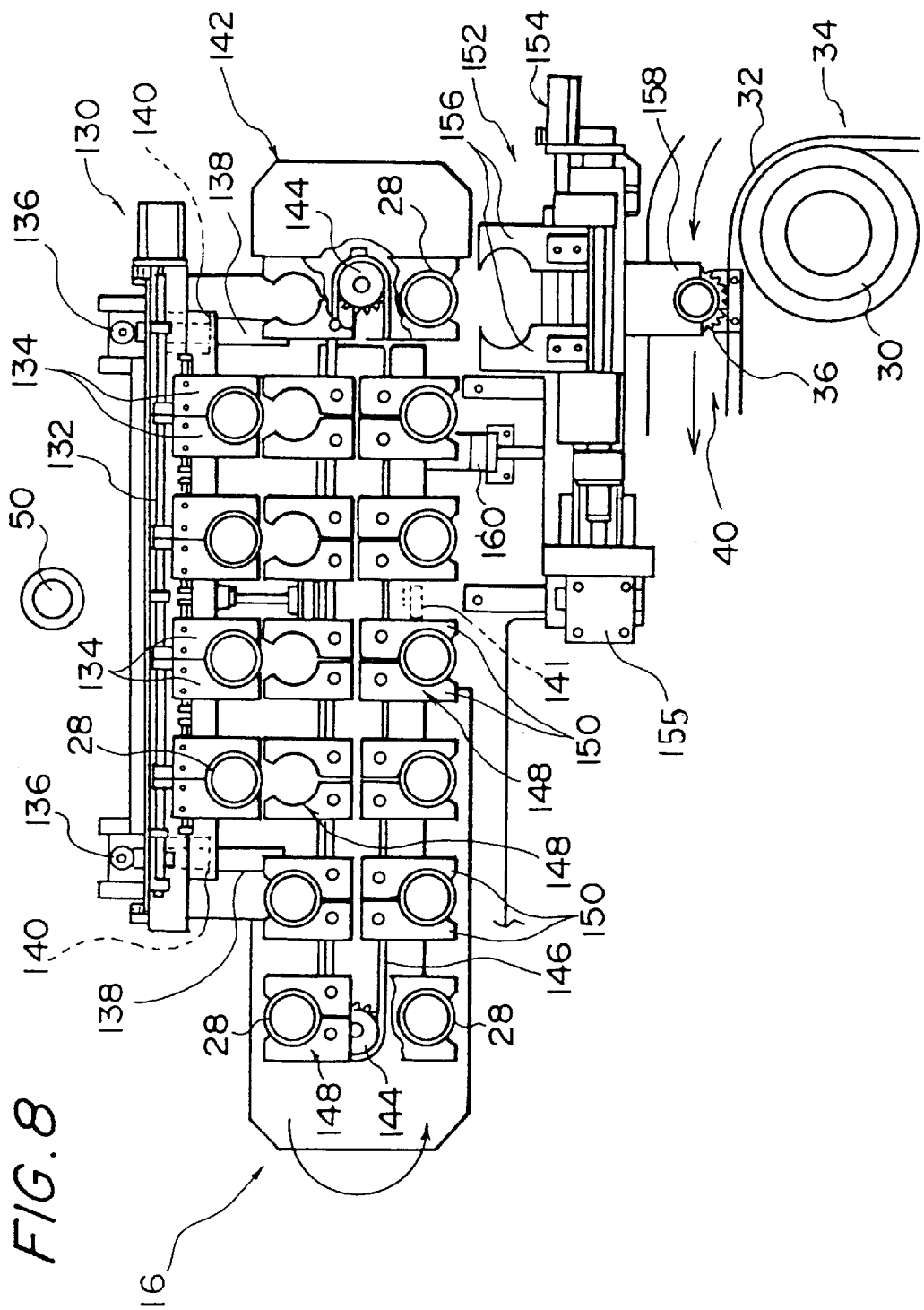
FIG. 8 is a plan view showing another embodiment of the transfer station.
Figure 9:
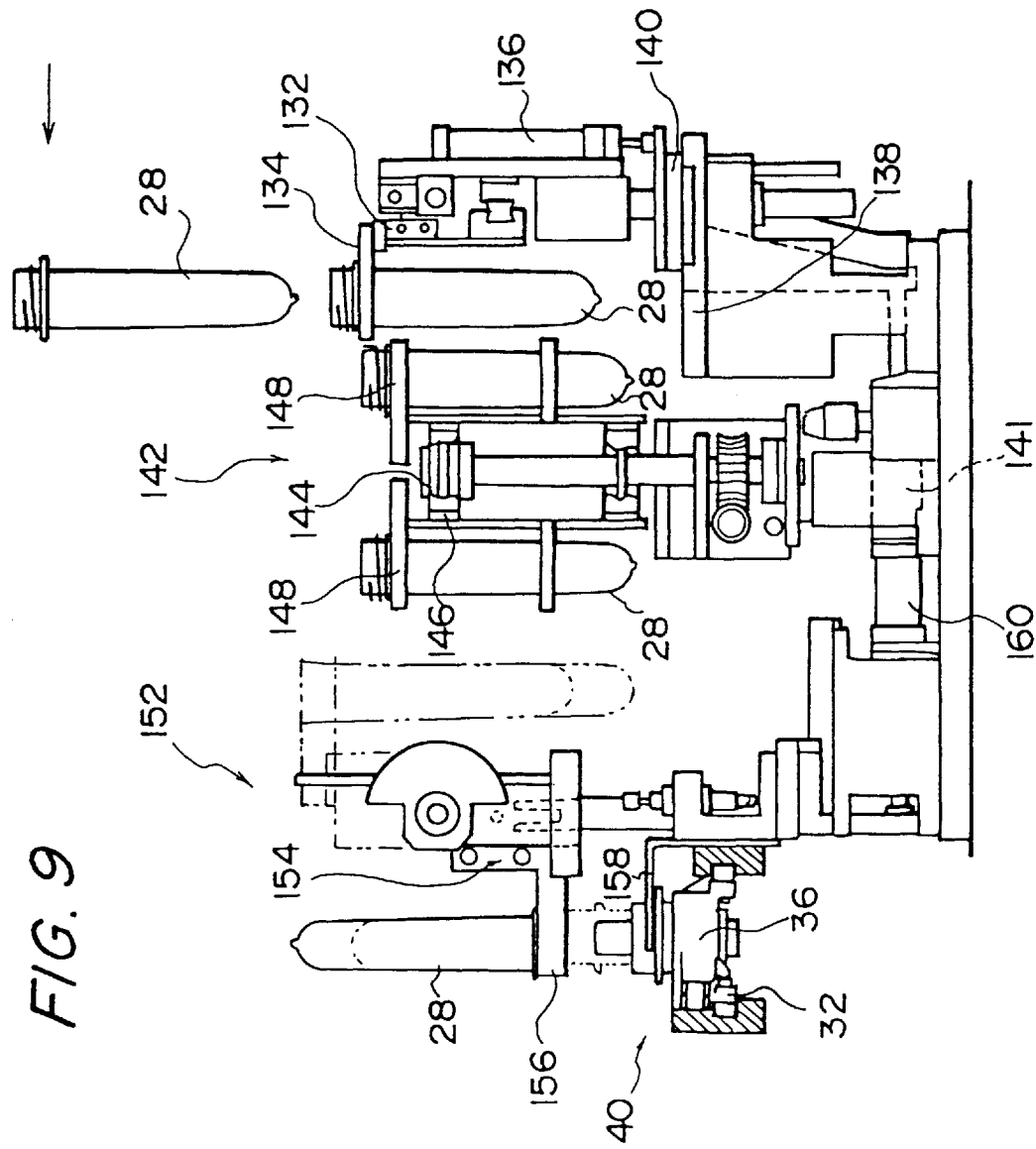
FIG. 9 is a side elevation of the transfer station of FIG. 8.

FIGS. 8 and 9 illustrate another embodiment of the transfer station.

This transfer station 16 has a receiving mechanism 130 having four first supporting members 134 can be opened and closed by a supporting member opening and closing mechanism 132, the supporting member opening and closing mechanism 132 and first supporting members 134 can be raised and lowered by a pair of first elevating cylinders 136, and by means of these first elevating cylinders 136 the first supporting members 134 are raised to below the neck portion of the preforms 28 in the removal section 24 at the time that the neck cavity mold is lowered, and support below the neck portion, and after unclamping of the neck cavity mold, are arranged to be lowered.

Again, the first supporting members 134, the supporting member opening and closing mechanism 132, and the first elevating cylinders 136 are mounted on a guide member 140 capable of sliding to the side of a movement mechanism 142 on a guide rail 138, and as this guide member 140 is driven by a horizontal drive cylinder 141 the first supporting members 134 are moved toward the side of the movement mechanism 142, and by means of the first supporting members 134 being opened by the supporting member opening and closing mechanism 132 preforms 28 are passed to the movement mechanism 142.

The movement mechanism 142 has a movement chain 146 passed around horizontally disposed movement sprockets 144, to which are attached for example fourteen second supporting members 148. The second supporting members 148 are arranged to be circulated in the horizontal plane. The second supporting members 148 are constructed of a resilient material, with two opening and closing jaws 150 urged toward the closed position to support a preform 28 at a bottom position of the neck portion, and when the first supporting members 134 are supporting the preforms 28, the preform 28 is inserted into the opening and closing jaws 150, opposing the urging force of the resilient material to open the opening and closing jaws 150 and dispose the preform 28 between the opening and closing jaws 150. At this point, the opening and closing jaws 150 are already closed, and when the first supporting members 134 are opened, the preform 28 drops out, and can be handed over supported on the second supporting members 148.

The second supporting members 148, by means of the movement chain 146, can be carried intermittently one at a time to the delivering position of an inverting receiving mechanism 152.

The inverting receiving mechanism 152 has the neck portion of the preforms 28 which are supported by the second supporting members 148 in the inverting and delivering position of the movement mechanism 142 seized by a third supporting member 156 which can be opened and closed by an opening and closing mechanism 154. Next, this third supporting member 156 is moved horizontally toward the side of the receiving section 40 of the blow molding station 14 by means of an advance and retract drive device 160, whereby the opening and closing jaws 150 of the second supporting members 148 are opened and removal is carried out. Next, by means of an elevating mechanism not shown in the drawings, the third supporting member is raised, and by means of an inverting drive device 155 the third supporting member 156 is turned through 180 degrees, and the preforms 28 are inverted from the upright state to the inverted state, by the lowering by means of the elevating mechanism the preforms are inserted into the carrying members 36 at the position of the receiving section 40, the third supporting member 156 is opened and the preforms 28 are released, and by means of the advance and retract drive device 160 the third supporting member 156 is retracted.

Again, the inverting receiving mechanism 152 is provided with a positioning means 158 for the carrying members 36, and this positioning means 158, when the third supporting member 156 is moved to the side of the receiving section 40 by the advance and retract drive device 160, is positioned in engagement with the carrying members 36.

The present invention is not limited to the above described embodiments, but a number of variant embodiments are possible within the scope of the present invention.

For example, although in the example given four preforms are blow-molded in the injection molding station and in the blow molding station blow molding is carried out one at a time, this example is not limiting, and any values may be chosen for the number of simultaneous injection molding and simultaneous blow molding preform.

Again, in the above described embodiment in the blow molding section the blow molding is carried out one at a time, as a result of which when carrying out inversion in the inverting receiving mechanism, the items are passed one at a time, but when for example a plurality of preforms are blow-molded simultaneously, a plurality are delivered and it is necessary to convert the pitch spacing between the preforms to the blow molding pitch. As a conversion means may be used the means described in the abovementioned Japanese Patent Application Laid-Open No. 8-132517.

Again, the cooling pot in the first described embodiment uses cooling water, but it is possible for the temperature to be controlled to be different in each pot, and depending on the molding conditions a heated fluid may be used.

What is claimed is:

1. An injection stretch blow molding apparatus, comprising:

an injection molding station in which preforms are injection molded in an upright state with neck portions thereof facing upward;

a blow molding station in which carrying members supporting said preforms are circularly carried and said preforms are stretch blow molded into containers in an inverted state;

a transfer station for inverting said preforms removed from said injection molding station and for transferring said preforms to said carrying members of said blow molding station; and wherein said transfer station includes:

a receiving mechanism for receiving said preforms from said injection molding station in the upright state;

an inverting and delivering mechanism for inverting said preforms at least one at a time and for delivering said preforms in the inverted state to said carrying members; and a movement mechanism disposed between said receiving mechanism and said inverting and delivering mechanism, and for moving said preforms from said receiving mechanism to said inverting and delivering mechanism in the upright state.

2. The injection stretch blow molding apparatus as defined in claim 1, wherein N (N≧2) numbers of said preforms are simultaneously injection molded in said injection molding station;

wherein said receiving mechanism has N numbers of first supporting members for receiving and supporting said N numbers of preforms; and wherein said movement mechanism has at least N numbers of second supporting members for supporting and moving said N numbers of preforms delivered from said first supporting members to a delivering position to said inverting and delivering mechanism.

3. The injection stretch blow molding apparatus as defined in claim 2, wherein said blow molding station has a blow molding section for blow molding a number n of said preforms into a number n of containers at a time; and wherein said inverting and delivering mechanism has a number n of third supporting members for receiving and supporting the number n of said preforms from said at least N numbers of second supporting members and for inverting and delivering the number n of said preforms, wherein the number n is greater than or equal to one and less than N (1≦n<N).

4. The injection stretch blow molding apparatus as defined in claim 2, wherein said movement mechanism has a circulatory movement means for circulating and moving said at least N numbers of second supporting members, and at least N numbers of said second supporting members having received said N numbers of preforms at a receiving position from said receiving mechanism are moved to the delivering position leading to said inverting and delivering mechanism by means of said circulatory movement means.

5. The injection stretch blow molding apparatus as defined in claim 4, wherein said circulatory movement means has a first endless moving member circulating in a vertical plane with said at least N numbers of second supporting members fixed thereto, and said first endless moving member has an upper movement region and a lower movement region, and wherein said receiving position and said delivering position are provided at said upper movement region.

6. The injection stretch blow molding apparatus as defined in claim 4, wherein said circulatory movement means has a second endless moving member circulating in the horizontal plane with said at least N numbers of second supporting members fixed thereto, and said second endless moving member has first and second movement regions parallel to each other in said horizontal plane, and wherein said receiving position is provided at said first movement region and said delivering position is provided at said second transfer region.

7. The injection stretch blow molding apparatus as defined in claim 2, wherein each of said at least N numbers of second supporting members has a depression for receiving and supporting the bottom of each of said preforms in the upright state.

8. The injection stretch blow molding apparatus as defined in claim 2, wherein each of said at least N numbers of second supporting members has a pair of opening and closing members biased by a resilient member in a closing direction and said pair of opening and closing members support a portion under said neck portion of each of said preforms.

9. The injection stretch blow molding apparatus as defined in claim 2, wherein said injection molding station comprises:

two injection core molds;

a rotary member which rotates around a rotating shaft and supports said two injection core molds at positions opposite to each other with said rotating shaft in the center;

an injection molding section including one injection cavity mold which is clamped alternately with one of said two injection core molds for injection molding said N numbers of preforms;

an ejecting section for ejecting said N numbers of injection molded preforms from the other of said two injection core molds which is carried out of said injection molding section by rotation of said rotary member; and wherein said ejecting section comprises:

N numbers of cooling pots into which are inserted said N numbers of preforms supported by said other of injection core molds; and elevator means for raising said N numbers of cooling pots to a position at which said N numbers of preforms are inserted and for lowering said N numbers of cooling pots before said N numbers of preforms are ejected.

10. The injection stretch blow molding apparatus as defined in claim 9, wherein said receiving mechanism further comprises means for retracting said N numbers of first supporting members to a position which is non-interference with said N numbers of cooling pots in the raised positions thereof, and for returning said N numbers of first supporting members to a position to receive said N numbers of preforms when they are ejected.

11. The injection stretch blow molding apparatus as defined in claim 10, wherein said receiving mechanism further comprises means for moving said N numbers of first supporting members which have received said N numbers of preforms to a delivering position leading to said movement mechanism.

* * * * *